(12) United States Patent  
Chao et al.

(10) Patent No.: US 8,142,040 B2
(45) Date of Patent: Mar. 27, 2012

(54) FIXING MECHANISM OF BACKLIGHT COMPONENT AND RELATED BACKLIGHT MODULE

(75) Inventors: Sheng-Chieh Chao, Taoyuan County (TW); Cheng-Sheng Chiang, Taipei County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 504 days.

(21) Appl. No.: 12/503,830

(22) Filed: Jul. 15, 2009

(65) Prior Publication Data

US 2010/0290209 A1 Nov. 18, 2010

(30) Foreign Application Priority Data

May 14, 2009 (TW) ................................ 98208341 U (51) Int. Cl.
*G09F 13/04* (2006.01)
(52) U.S. Cl. ................. 362/97.1; 362/97.2; 362/217.11; 362/217.15; 362/225; 349/70; 439/233; 439/235
(58) Field of Classification Search ..................... 349/70; 362/97.1, 97.2, 217.1, 217.11–217.17, 225, 362/382; 439/232, 233, 235
See application file for complete search history.

(56) References Cited

U.S. PATENT DOCUMENTS

| | | | |
|---|---|---|---|
| 7,549,881 B2 * | 6/2009 | Cho et al. | 439/235 |
| 7,926,965 B2 * | 4/2011 | Cho et al. | 362/97.1 |
| 8,040,457 B2 * | 10/2011 | Kim et al. | 349/70 |

\* cited by examiner

*Primary Examiner* — Stephen F Husar
(74) *Attorney, Agent, or Firm* — Winston Hsu; Scott Margo (57) ABSTRACT

A fixing mechanism of backlight component includes a metal bezel, a socket, a lamp sheathing structure, and an external frame. A fixing hole is formed on the metal bezel. A fixing structure is formed on an end of the socket for inserting into the fixing hole of the metal bezel to electrically connect to a power control circuit board. A groove is formed on the other end of the socket for containing a lamp. The lamp sheathing structure is disposed on the metal bezel for sheathing the lamp so as to fix the lamp with the socket together. The external frame is disposed on the metal bezel and abuts against the lamp sheathing structure to fix the lamp sheathing structure on the metal bezel.

16 Claims, 7 Drawing Sheets

FIXING MECHANISM OF BACKLIGHT COMPONENT AND RELATED BACKLIGHT MODULE

BACKGROUND OF THE INVENTION

1. Field of the Invention

The present invention relates to a fixing mechanism of backlight component and a related backlight module, and more specifically, to a fixing mechanism capable of fixing a socket on a metal bezel and a related backlight module.

2. Description of the Prior Art

Since liquid crystal molecules do not produce light themselves, a common method for driving an LCD to display images involves utilizing a backlight module to provide light with sufficient brightness and uniform distribution to the LCD so as to make the LCD display corresponding images. Therefore, a backlight module is one of the major components of an LCD. A traditional backlight module uses a cold cathode fluorescent lamp (CCFL) as a light source. A common method for disposing cold cathode fluorescent lamps in a backlight module involves disposing two or more cold cathode fluorescent lamps in the bottom of the backlight module, which is a so-called "direct-type" method.

In general, in a traditional direct-type backlight module, a complicated voltage transformation circuit is always needed for driving a cold cathode fluorescent lamp to emit light. Therefore, an LIPS circuit board, on which a power supply and an inverter are integrally installed, is manufactured accordingly for space saving in a backlight module. A common method for electrical connection of an LIPS circuit board and a socket is to utilize the socket to clamp and electrically connect to a cold cathode fluorescent lamp and then utilize contact fingers of the LIPS circuit board to contact metal pads disposed inside the socket. In such a manner, driving current provided from the LIPS circuit board may be transmitted to the cold cathode fluorescent lamp via the socket. The aforementioned method usually utilizes engagement of a bezel, which is disposed between the cold cathode fluorescent lamp and the LIPS circuit board, and the socket (e.g. engagement of a hook on the socket and a fixing hole on the bezel) to fix the socket on the bezel. Furthermore, the bezel is usually made of plastic material by an injection molding process. However, not only molding size limit of the injection molding process may cause a difficult manufacturing process for a large-size bezel, but poor structural strength of plastic material may also make a formed bezel have insufficient structural strength. If the bezel is made of metal material instead, the socket may be scraped easily due to a structural strength difference between the metal bezel and the socket. That is, when the hook on the socket is engaged with the fixing hole on the metal bezel, the socket may be scraped by the metal bezel and produce scrapings in the backlight module so as to generate dark spots on an LCD panel.

In summary, how to manufacture a large-size bezel of high structural strength and avoid the said problems should be a concern in structural design of a backlight module.

SUMMARY OF THE INVENTION

The present invention provides a fixing mechanism of backlight component comprising a metal bezel, a fixing hole being formed on the metal bezel; a socket, a fixing structure being formed on an end of the socket for inserting into the fixing hole of the metal bezel to electrically connect to a power control circuit board, a groove being formed on the other end of the socket for containing a lamp; a lamp sheathing structure disposed on the metal bezel, the lamp sheathing structure used for sheathing the lamp so as to fix the lamp cooperatively with the socket; and an external frame disposed on the metal bezel and abutting against the lamp sheathing structure, the external frame used for fixing the lamp sheathing structure on the metal bezel.

The present invention further provides a backlight module comprising a lamp; a power control circuit board for providing a driving current to the lamp; and a fixing mechanism of backlight component disposed between the lamp and the power control circuit board, the fixing mechanism of backlight component comprising a metal bezel, a fixing hole being formed on the metal bezel; a socket, a fixing structure being formed on an end of the socket for inserting into the fixing hole of the metal bezel to electrically connect to the power control circuit board, a groove being formed on the other end of the socket for containing the lamp; a lamp sheathing structure disposed on the metal bezel, the lamp sheathing structure used for sheathing the lamp so as to fix the lamp cooperatively with the socket; and an external frame disposed on the metal bezel and abutting against the lamp sheathing structure, the external frame used for fixing the lamp sheathing structure on the metal bezel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function In the following description and in the claims, the terms "include" and "comprise" are used in an open-ended fashion, and thus should be interpreted to mean "include, but not limited to . . . " Also, the term "electrically connect" is intended to mean either an indirect or direct electrical connection. Accordingly, if one device is coupled to another device, that connection may be through a direct electrical connection, or through an indirect electrical connection via other devices and connections.

Figure 1:
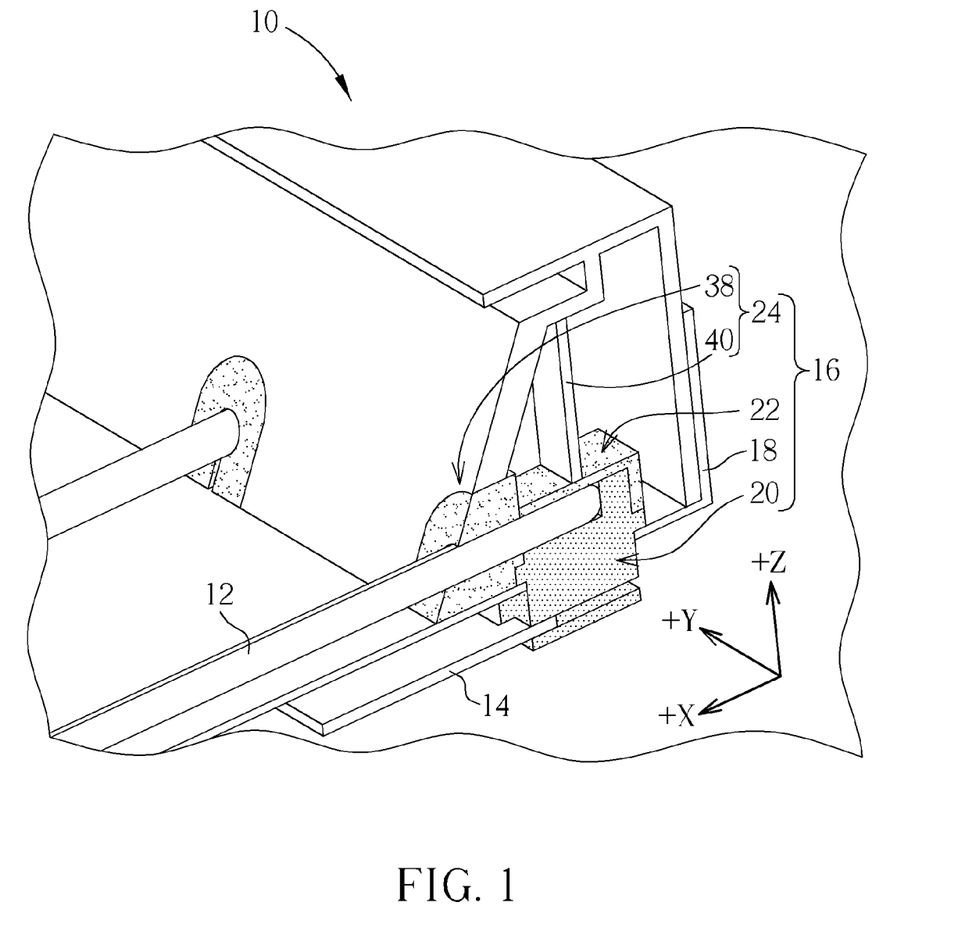
FIG. 1 is a cross-sectional diagram of a backlight module according to a preferred embodiment of the present invention.
Figure 2:
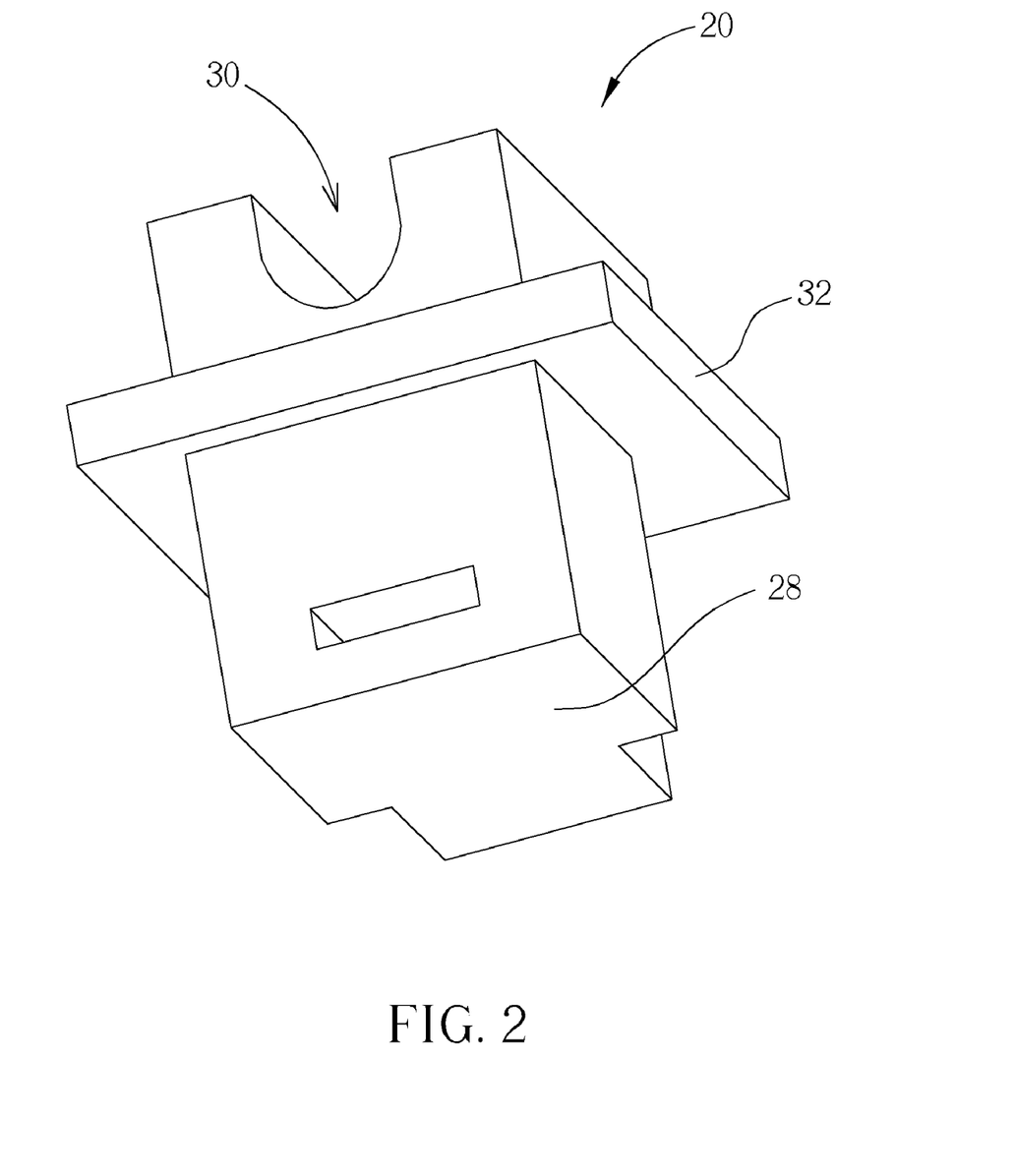
FIG. 2 is an enlarged diagram of the socket in FIG. 1.
Figure 3:
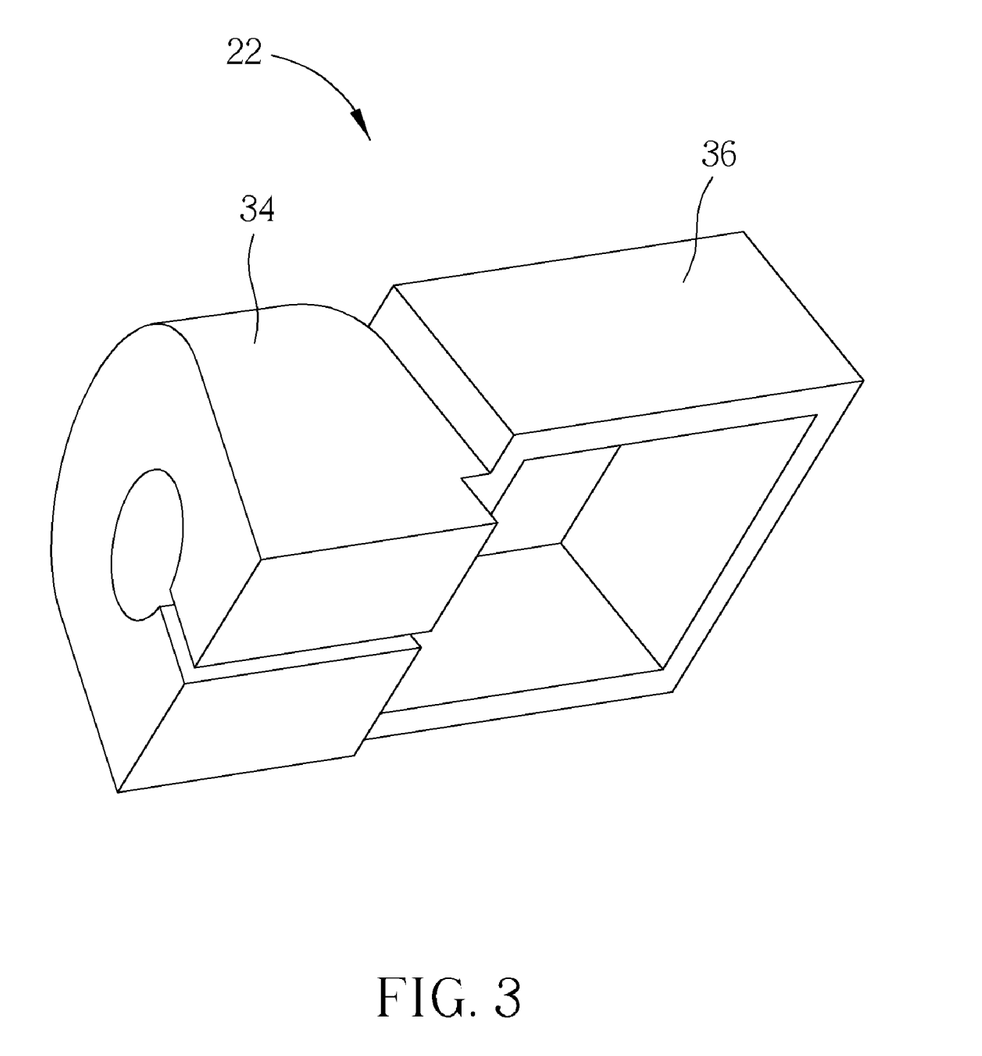
FIG. 3 is an enlarged diagram of the lamp sheathing structure in FIG. 1.

Please refer to FIG. 1, which is a cross-sectional diagram of a backlight module 10 according to a preferred embodiment of the present invention. As shown in FIG. 1, the backlight module 10 includes a lamp 12, a power control circuit board 14, and a fixing mechanism of backlight component 16. The lamp 12 is preferably a cold cathode fluorescent lamp. The power control circuit board 14 is preferably a LIPS circuit board. The power control circuit board 14 is used for providing the lamp 12 with driving current. The fixing mechanism of backlight component 16 includes a metal bezel 18, a socket 20, a lamp sheathing structure 22, and an external frame 24. A fixing hole 26 is formed on the metal bezel 18. Next, please refer to FIG. 2, which is an enlarged diagram of the socket 20 in FIG. 1. The socket 20 is used for transmitting the driving current provided from the power control circuit board 14 to the lamp 12. As mentioned in the prior art, the method for electrically connect the power control circuit board 14 to the socket 20 is to utilize contact fingers on the power control circuit board 14 to contact metal pads disposed inside the socket 20. Next, as shown in FIG. 2, a fixing structure 28 is formed on an end of the socket 20. The fixing structure 28 is used for inserting into the fixing hole 26 of the metal bezel 18. The fixing structure 28 is preferably a T-shaped pillar. A groove 30 is formed on the other end of the socket 20. The groove 30 is used for containing the lamp 12. Furthermore, the socket 20 includes a block structure 32. The block structure 32 is used for abutting against the outer edge of the fixing hole 26 when the fixing structure 28 is inserted into the fixing hole 26, so that the socket 20 may be disposed on the metal bezel 18. Next, please refer to FIG. 1 and FIG. 3. FIG. 3 is an enlarged diagram of the lamp sheathing structure 22 in FIG. 1. As shown in FIG. 1 and FIG. 3, the lamp sheathing structure 22 is disposed on the metal bezel 18 and includes a sheathing head 34 and a dustproof lid 36. The sheathing head 34 is used for sheathing the lamp 12 so as to fix the lamp 12 on the metal bezel 18 cooperatively with the socket 20. The dustproof lid 36 is connected to the sheathing head 34 and covers the socket 20 for preventing dust from entering the socket 20. Furthermore, in the embodiment of the present invention, the lamp sheathing structure 22 is preferably made of flexible material, such as rubber. Next, as shown in FIG. 1, the external frame 24 is disposed on the metal bezel 18. The external frame 24 includes an engaging structure 38 and a rib structure 40. The engaging structure 38 is used for engaging with the sheathing head 34 of the lamp sheathing structure 22. In other words, the engaging structure 38 is a semi-circular opening structure corresponding to the shape of the sheathing head 34, and the rib structure 40 extends from a side of the engaging structure 38. The rib structure 40 is used for abutting against the dustproof lid 36 so as to fix the lamp sheathing structure 22 on the metal bezel 18 cooperatively with the engaging structure 38.

Figure 4:
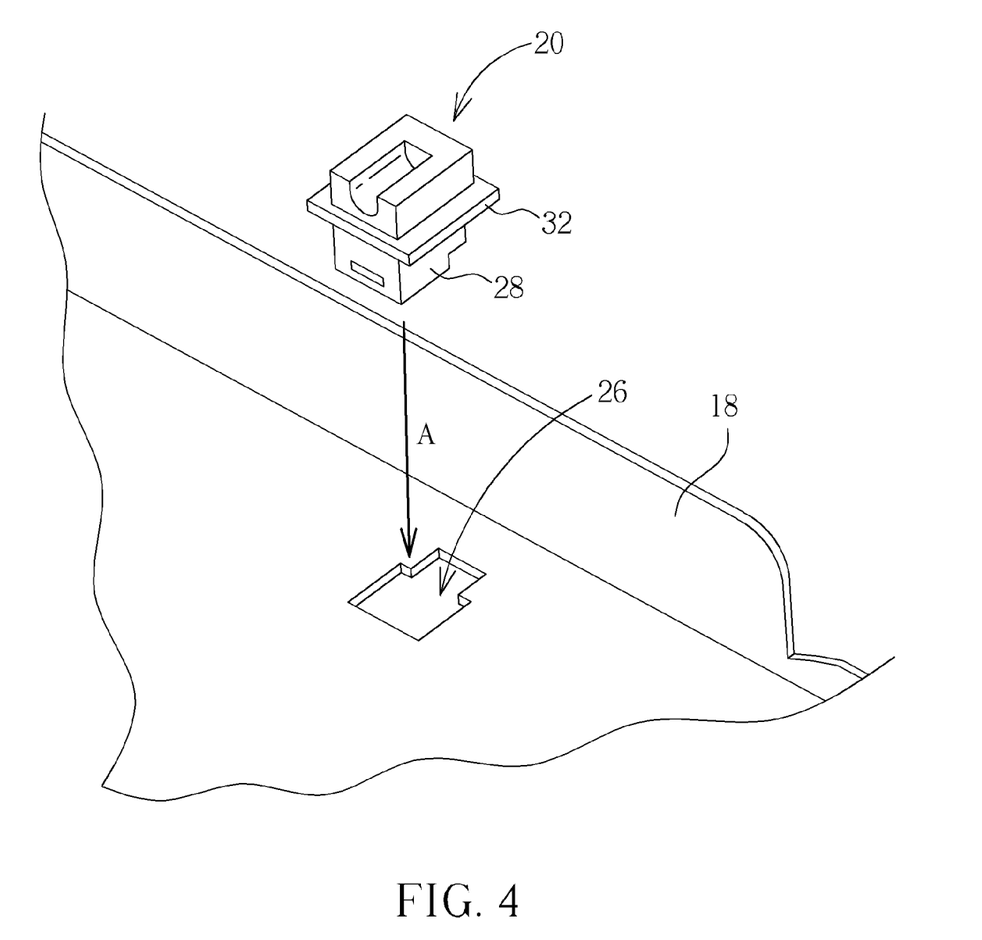
FIG. 4 is an exploded diagram of the metal bezel and the socket in FIG. 1.
Figure 5:
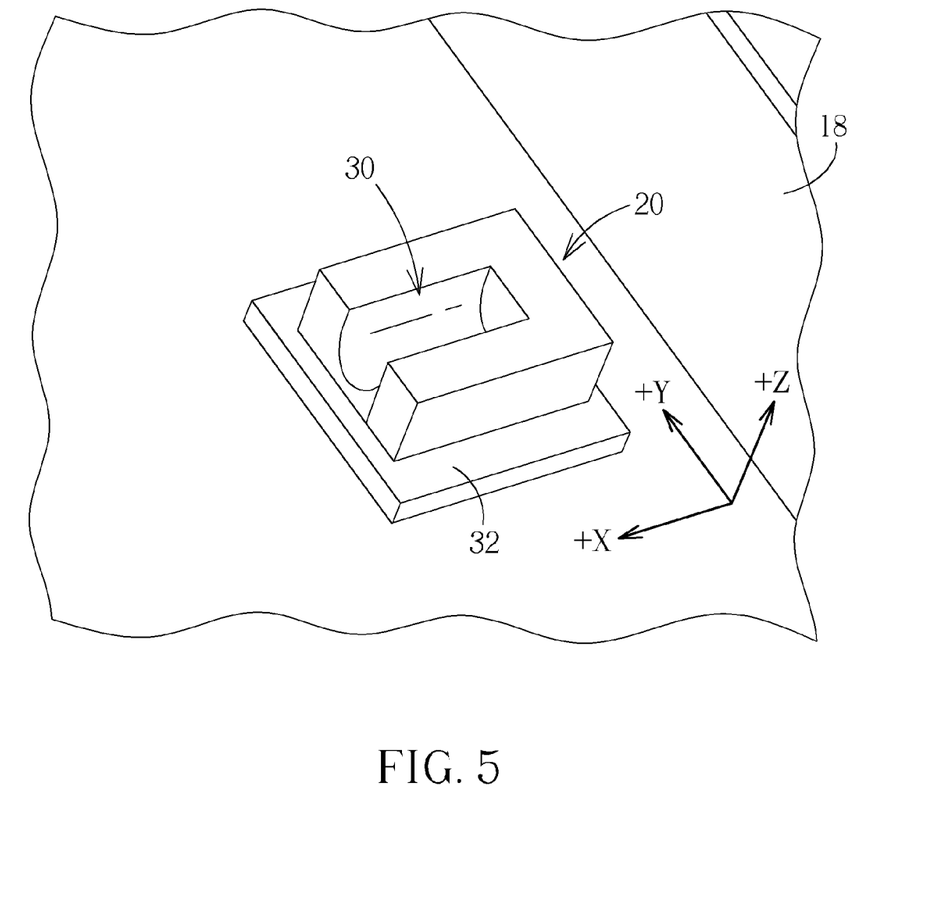
FIG. 5 is an assembly diagram of the metal bezel and the socket in FIG. 4.
Figure 6:
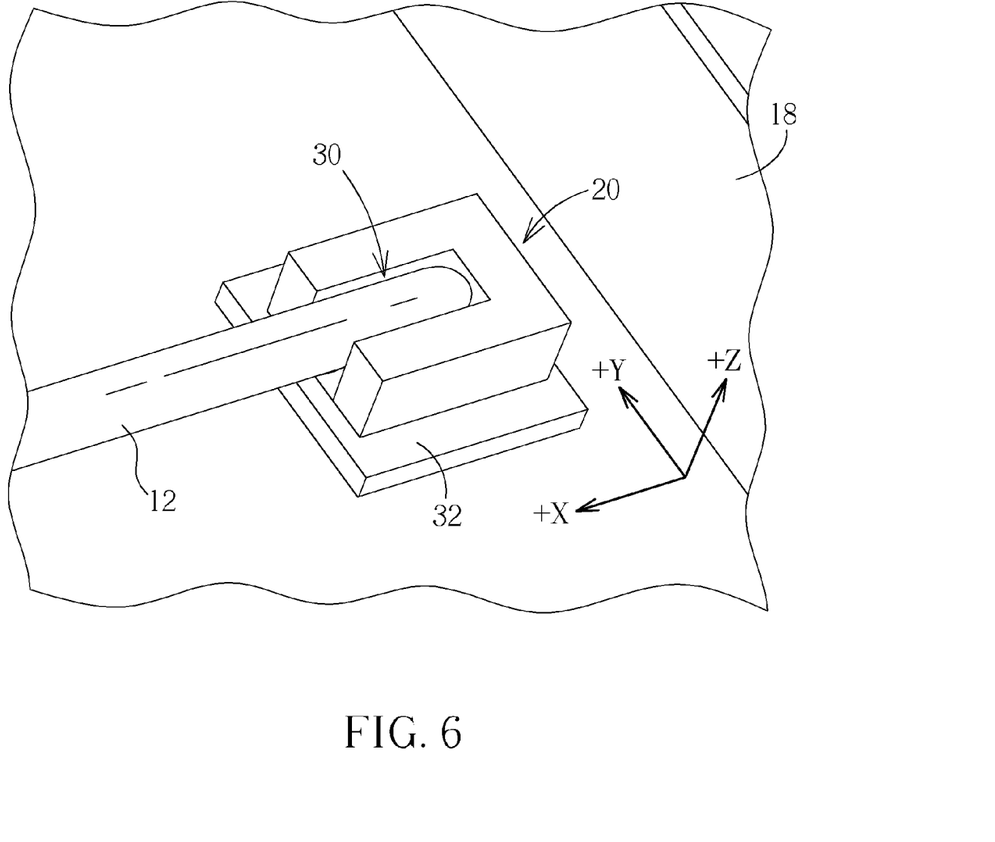
FIG. 6 is a diagram of disposing the lamp in the groove of the socket in FIG. 5.
Figure 7:
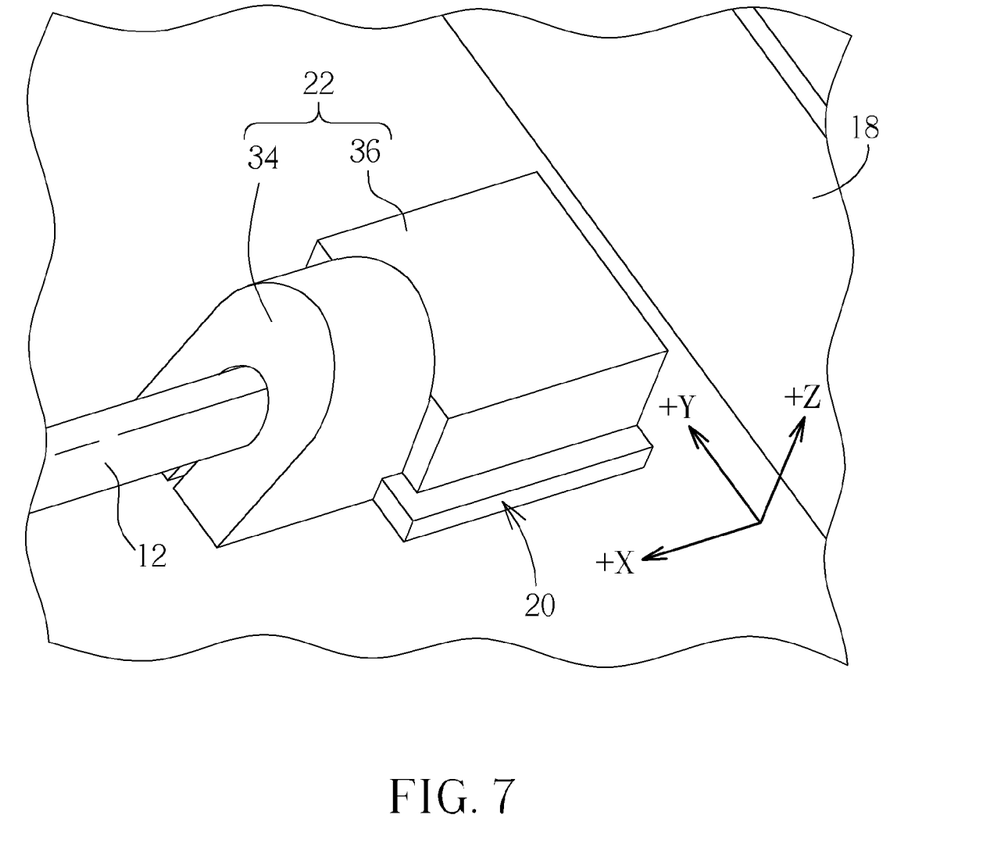
FIG. 7 is a diagram of disposing the lamp sheathing structure on the lamp and the socket in FIG. 6.

More detailed description for assembly of the backlight module 10 is provided as follows. First, please refer to FIG. 4 and FIG. 5. FIG. 4 is an exploded diagram of the metal bezel 18 and the socket 20 in FIG. 1. FIG. 5 is an assembly diagram of the metal bezel 18 and the socket 20 in FIG. 4. As mentioned above, the fixing structure 28 of the socket 20 is a T-shaped pillar, and as shown in FIG. 4, the fixing hole 26 is a T-shaped hole corresponding to the fixing structure 28. In such a manner, the fixing structure 28 of the socket 20 may be inserted into the fixing hole 26 of the metal bezel 18 along a direction indicated by an arrow "A" shown in FIG. 4 until the block structure 32 of the socket 20 abuts against the outer edge of the fixing hole 26 (as shown in FIG. 5). At this time, the movement of the socket 20 toward a X-axis direction, a Y-axis direction, and a −Z-axis direction is constrained by the engagement of the fixing hole 26 of the metal bezel 18 and the socket 20. Next, please refer to FIG. 6, which is a diagram of disposing the lamp 12 in the groove 30 of the socket 20 in FIG. 5. After the socket 20 is disposed on the metal bezel 18 as shown in FIG. 5, the lamp 12 may be inserted into the groove 30 on the socket 20 so that the electrical connection between the lamp 12 and the socket 20 may be therefore completed as shown in FIG. 6. As for the method for electrically connecting the lamp 12 to the socket 20, the related description is omitted herein since it is commonly seen in the prior art. Next, please refer to FIG. 7, which is a diagram of disposing the lamp sheathing structure 22 on the lamp 12 and the socket 20 in FIG. 6. As shown in FIG. 7, after the electrical connection of the lamp 12 and the socket 20 is completed, the sheathing head 34 of the lamp sheathing structure 22 may be utilized to sheathe the lamp 12 and the dustproof lid 36 may be utilized to cover the socket 20 for protection of the lamp 12 and the socket 20 and preventing dust from entering the lamp 12 and the socket 20. Finally, please refer to FIG. 1. After the lamp sheathing structure 22 is disposed on the lamp 12 and the socket 20 in FIG. 6, the engaging structure 38 of the external frame 24 may be engaged with the sheathing head 34 of the lamp sheathing structure 22. At the same time, the rib structure 40 of the external frame 24 may also abut against the dustproof lid 36 of the lamp sheathing structure 22, meaning that the movement of the socket 20 toward a +Z-axis direction is constrained by the external frame 24. Furthermore, as stated before, the lamp sheathing structure 22 is made of flexible material. Thus, the backlight module 10 may utilize the flexibility of the lamp sheathing structure 22 to offer a cushion function when the external frame 24 presses the lamp sheathing structure 22 to fix the socket 20 on the metal bezel 18. In such a manner, the movement of the socket 20 toward the X-axis direction, the Y-axis direction, and the Z-axis direction is totally constrained by the assembly of the metal bezel 18, the lamp sheathing structure 22, and the external frame 24, so that the socket 20 with the lamp 12 may be fixed on the metal bezel 18 and the assembly of the backlight module 10 may be therefore completed.

It should be mentioned that the structural design of the fixing structure 28 is not limited to the aforementioned embodiment. For example, the fixing structure 28 may also be a cross-shaped pillar or a cylindrical pillar. In other words, the structural design of the fixing structure 28 depends on practical needs of the backlight module 10. In addition, the shape of the fixing hole 26 may also be changed accordingly. Similarly, the rib structure 40 of the external frame 24 may also be not limited to the structural design mentioned in the said embodiment. For example, the rib structure 40 may also be other extending structure, such as a cylindrical rib structure. Furthermore, the rid structure 40 may be an optional structure in the backlight module 10. That is, the backlight module 10 may utilize the engaging structure 38 and the rib structure 40 of the external frame 24 to respectively abut against the sheathing head 34 and the dustproof lid 36 so that the lamp sheathing structure 22 and the socket 20 may be fixed on the metal bezel 18 more firmly; or may only utilize the engagement of the engaging structure 38 of the external frame 24 and the sheathing head 34 of the lamp sheathing structure 22 to fix the lamp sheathing structure 22 and the socket 20 on the metal bezel 18 without the rib structure 40 for simplifying the structural complexity of the external frame 24. In addition, the fixing structure 28 may also be an optional structure on the socket 20, meaning that the present invention may also utilize other structural designs to constrain the movement of the socket 20 toward the −Z-axis direction, such as tight fit of the fixing structure 28 and the fixing hole 26. Furthermore, when the contact fingers of the power control circuit board 14 are inserted into the socket 20 as shown in FIG. 1 for electrical connection of the power control circuit board 14 and the socket 20, the movement of the socket 20 toward the −Z-axis direction may also be constrained by the contact fingers of the power control circuit board 14.

Compared with the prior art, in which engagement of a fixing hole on a plastic bezel and a hook on a socket is utilized to fix the socket on the plastic board, the present invention utilizes the engagement of the fixing structure, the block structure, and the fixing hole to constrain the movement of the socket toward the X-axis direction, the Y-axis direction, and the −Z-axis direction, and then utilizes the external frame to press the lamp sheathing structure to fix the socket for constraining the movement of the socket toward the +Z-axis direction. Thus, the socket may be fixed on the metal bezel firmly. In such a manner, the backlight module provided by the present invention may not only utilize fit of the fixing structure and the fixing hole to protect the socket from being scraped by the metal bezel, but may also utilize the metal bezel of high formability and high structural strength to replace a limited size plastic bezel of poor structural strength.

Those skilled in the art will readily observe that numerous modifications and alterations of the device and method may be made while retaining the teachings of the invention.

What is claimed is:

1. A fixing mechanism of backlight component comprising:
    a metal bezel, a fixing hole being formed on the metal bezel;
    a socket, a fixing structure being formed on an end of the socket for inserting into the fixing hole of the metal bezel to electrically connect to a power control circuit board, a groove being formed on the other end of the socket for containing a lamp;
    a lamp sheathing structure disposed on the metal bezel, the lamp sheathing structure used for sheathing the lamp so as to fix the lamp cooperatively with the socket; and
    an external frame disposed on the metal bezel and abutting against the lamp sheathing structure, the external frame used for fixing the lamp sheathing structure on the metal bezel.

2. The fixing mechanism of backlight component of claim 1, wherein the fixing structure is a T-shaped pillar and the fixing hole is a T-shaped hole corresponding to the T-shaped pillar.

3. The fixing mechanism of backlight component of claim 1, wherein the socket comprises a block structure for abutting against an outer edge of the fixing hole when the fixing structure is inserted into the fixing hole.

4. The fixing mechanism of backlight component of claim 1, wherein the lamp sheathing structure comprises:
    a sheathing head for sheathing the lamp; and
    a dustproof lid connected to the sheathing head, the dustproof lid used for covering the socket.

5. The fixing mechanism of backlight component of claim 1, wherein the lamp sheathing structure is made of flexible material.

6. The fixing mechanism of backlight component of claim 5, wherein the lamp sheathing structure is made of rubber material.

7. The fixing mechanism of backlight component of claim 4, wherein the external frame comprises:
    an engaging structure for engaging with the sheathing head of the lamp sheathing structure; and
    a rib structure extending from a side of the engaging structure, the rib structure used for abutting against the dustproof lid so as to fix the lamp sheathing structure on the metal bezel cooperatively with the engaging structure.

8. A backlight module comprising:
    a lamp;
    a power control circuit board for providing a driving current to the lamp; and
    a fixing mechanism of backlight component disposed between the lamp and the power control circuit board, the fixing mechanism of backlight component comprising:
        a metal bezel, a fixing hole being formed on the metal bezel;
        a socket, a fixing structure being formed on an end of the socket for inserting into the fixing hole of the metal bezel to electrically connect to the power control circuit board, a groove being formed on the other end of the socket for containing the lamp;
        a lamp sheathing structure disposed on the metal bezel, the lamp sheathing structure used for sheathing the lamp so as to fix the lamp cooperatively with the socket; and
        an external frame disposed on the metal bezel and abutting against the lamp sheathing structure, the external frame used for fixing the lamp sheathing structure on the metal bezel.

9. The backlight module of claim 8, wherein the fixing structure is a T-shaped pillar and the fixing hole is a T-shaped hole corresponding to the T-shaped pillar.

10. The backlight module of claim 8, wherein the socket comprises a block structure for abutting against an outer edge of the fixing hole when the fixing structure is inserted into the fixing hole.

11. The backlight module of claim 8, wherein the lamp sheathing structure comprises:
    a sheathing head for sheathing the lamp; and
    a dustproof lid connected to the sheathing head, the dustproof lid used for covering the socket.

12. The backlight module of claim 8, wherein the lamp sheathing structure is made of flexible material.

13. The backlight module of claim 12, wherein the lamp sheathing structure is made of rubber material.

14. The backlight module of claim 8, wherein the lamp is a cold cathode fluorescent lamp (CCFL).

15. The backlight module of claim 8, wherein the power control circuit board is an LIPS (LCD inverter power supply) circuit board.

16. The backlight module of claim 11, wherein the external frame comprises:
    an engaging structure for engaging with the sheathing head of the lamp sheathing structure; and
    a rib structure extending from a side of the engaging structure, the rib structure used for abutting against the dustproof lid so as to fixing the lamp sheathing structure on the metal bezel cooperatively with the engaging structure.

* * * * *